US007050588B1

(12) United States Patent
Wajs et al.

(10) Patent No.: US 7,050,588 B1
(45) Date of Patent: May 23, 2006

(54) SYSTEM FOR PROCESSING AN INFORMATION SIGNAL

(75) Inventors: Andrew Augustine Wajs, Haarlem (NL); Gerard Johan Dekker, Leiderdorp (NL)

(73) Assignee: Irdeto Access B.V., Hoofddorp (NL)

( * ) Notice: Subject to any disclaimer, the term of this patent is extended or adjusted under 35 U.S.C. 154(b) by 0 days.

(21) Appl. No.: 09/601,233

(22) PCT Filed: Dec. 7, 1999

(86) PCT No.: PCT/EP99/09575

§ 371 (c)(1),
(2), (4) Date: Jul. 31, 2000

(87) PCT Pub. No.: WO00/35198

PCT Pub. Date: Jun. 15, 2000

(30) Foreign Application Priority Data

Dec. 8, 1998 (EP) ................................. 98204137

(51) Int. Cl.
*H04L 9/00* (2006.01)
(52) U.S. Cl. ....................... 380/269; 380/210; 380/217
(58) Field of Classification Search ........ 380/268–269; 713/176, 172
See application file for complete search history.

(56) References Cited

U.S. PATENT DOCUMENTS 5,862,260 A * 1/1999 Rhoads ........................ 382/232

6,567,533 B1 * 5/2003 Rhoads ........................ 382/100
6,618,484 B1 * 9/2003 Van Wie et al. ............. 380/232

FOREIGN PATENT DOCUMENTS

WO 9700578 1/1997
WO 9800977 1/1998

OTHER PUBLICATIONS

Tang, Lei, "Methods for Encrypting and Decrypting MPEG Video Data Efficiently," GSIA Carnegie Mellon University, Nov. 18, 1996. 11 pages.
Rao, K. R., et al., "Techniques and Standards for Image, Video, and Audio Coding", *Kunsan National University Republic of Korea*, (1996), pp. 395-396.

* cited by examiner

*Primary Examiner*—Kambiz Zand
(74) *Attorney, Agent, or Firm*—Schwegman, Lundberg, Woessner & Kluth, P.A.

(57) ABSTRACT

A system for processing an information signal comprises a system (1) for scrambling the information signal and at least one system (2) for descrambling the scrambled information signal. The scrambling system (1) comprises means (3,6) for analysing the entropy distribution of the information signal, means (5,6,7,9) for scrambling the information signal in dependence on the entropy distribution of the information signal to provide a scrambled information signal having an entropy distribution corresponding with the entropy distribution of the information signal and means (11) for compressing the scrambled information signal. The descrambling system (2) comprises means (14) for decompressing the compressed scrambled information signal and means (16,19,21,22,24) for descrambling the scrambled information signal to provide the information signal.

42 Claims, 7 Drawing Sheets

SYSTEM FOR PROCESSING AN INFORMATION SIGNAL

The invention relates to a system for processing an information signal, comprising a system for scrambling the information signal and at least one system for descrambling the scrambled information signal. The invention further relates to a system for scrambling an information signal, a system for descrambling a scrambled information signal, and to applications of these systems.

In known systems of this type the clear information signal is compressed and then the compressed information signal is scrambled to protect the information signal against unauthorised copying. For obtaining the clear information signal, the scrambled compressed information signal is first descrambled and thereafter decompressed. However in the available systems wherein the clear information signal is provided by descrambling and decompressing, it is relatively easy for an unauthorised person to copy the descrambled information signal which is still compressed. In this manner a clear compressed copy of the information signal becomes available to an unauthorised person. This is a serious disadvantage of the known systems.

The present invention aims to provide improved systems of the above-mentioned type, wherein protection against copying of the information signal is significantly improved.

According to the invention a system for processing an information signal is provided, comprising a system for scrambling the information signal and at least one system for descrambling the scrambled information signal, said scrambling system comprising means for analysing the entropy distribution of the information signal, means for scrambling the information signal in dependence on the entropy distribution of the information signal to provide a scrambled information signal having an entropy distribution corresponding with the entropy distribution of the information signal and means for compressing the scrambled information signal, said descrambling system comprising means for decompressing the compressed scrambled information signal, means for descrambling the scrambled information signal to provide the information signal.

The invention is based on the insight that it is possible to use existing compressing techniques on a scrambled information signal provided that the entropy distribution of the scrambled information signal is not significantly changed with respect to original information signal. By analysing the information signal to determine the entropy distribution the scrambling can be carried out such that the entropy distribution is hardly changed. Although the information in the scrambled signal will generally not be hidden completely, the quality of the scrambled signal will be such that it cannot be used without descrambling.

The invention further provides scrambling and descrambling systems operating according to the same principle, and applications of these systems.

The invention will be further explained by reference to the drawings in which some embodiments of the different systems of the invention are schematically shown.

Figure 5:
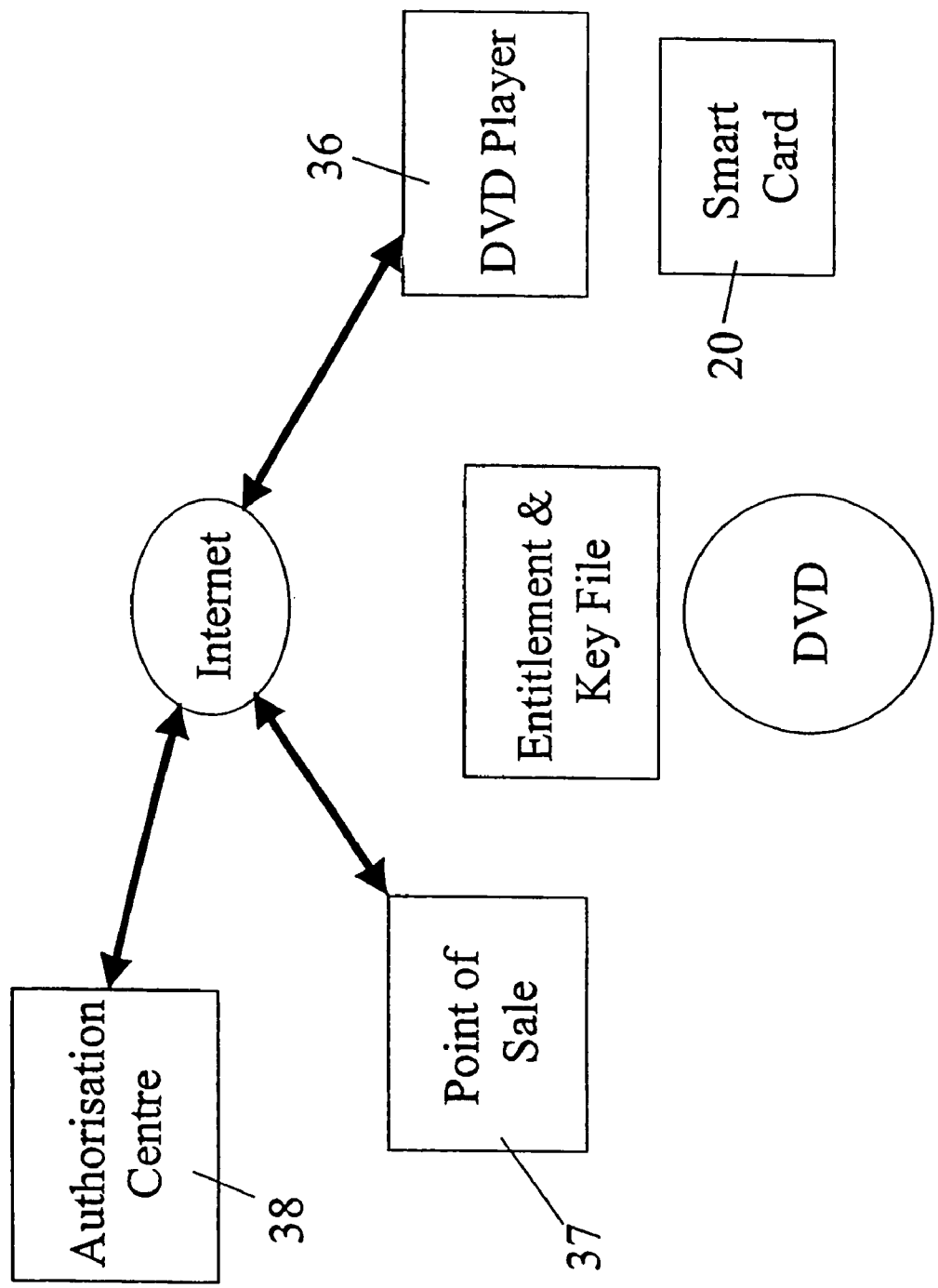

FIG. 5 schematically shows an application of the invention in DVD-players.

Figure 1A:
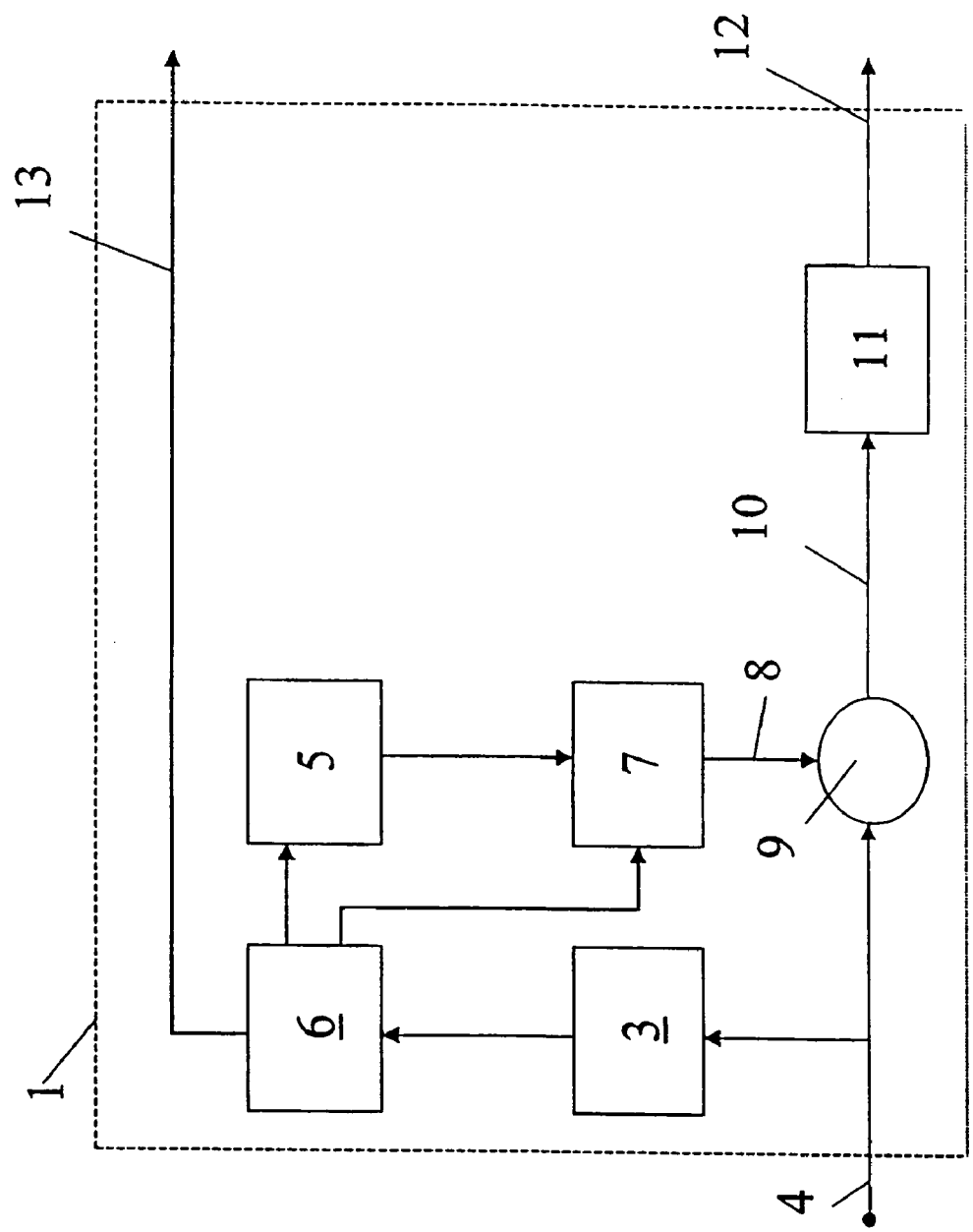
FIGS. 1A and 1B show a block diagram of a first embodiment of the system for processing an information signal according to the invention.
Figure 1B:
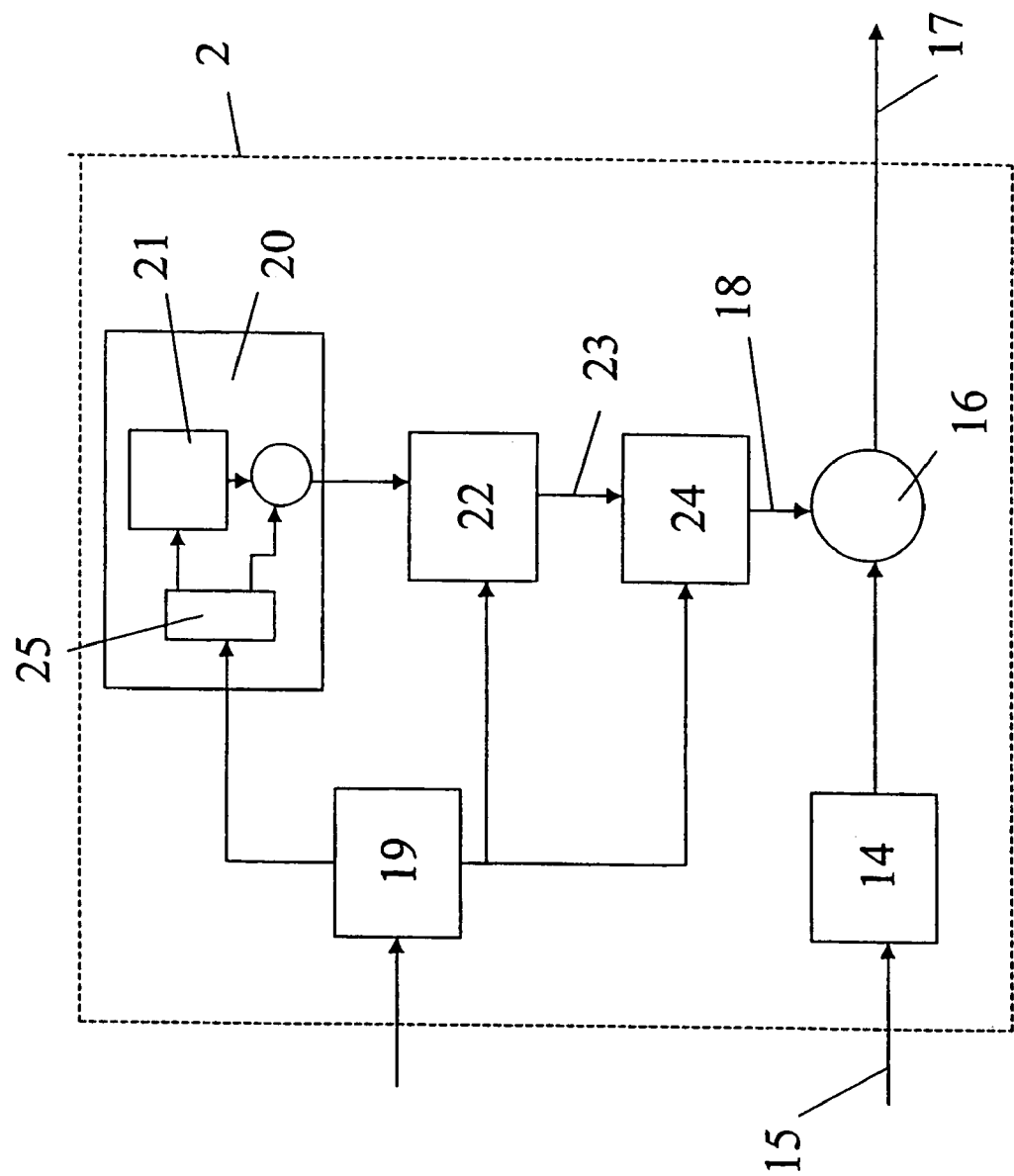

Referring to FIGS. 1A and 1B there is shown a system for processing an information signal, which system comprises a system 1 for scrambling the information signal (FIG. 1A) and at least one system 2 for descrambling the scrambled information signal (FIG. 1B). Although only one descrambling system is shown in FIG. 1B the system may include a number of such descrambling systems. The scrambling system 1 comprises an analyser or means for analysing 3 receiving the information signal to be compressed from an input 4. The analyser 3 analyses the information signal to determine the entropy distribution of this signal. In case of an audio signal for example, the analyser 3 may include a number of narrow band filters as will be described hereinafter. The scrambling system 1 further comprises generating means 5 for generating a noise signal. In the embodiment described this generating means is made as a white noise generator, for example a pseudo random signal generator. This noise generator 5 receives a key from a control unit 6. The control unit 6 receives information on the entropy distribution from the analyser 3 and provides scrambling control information to a processor 7 which receives the noise output signal from the noise generator 5. The scrambling control information controls the processor 7 in such a manner that the processor 7 provides a noise signal on an output 8 having an entropy distribution corresponding with the entropy distribution of the information signal received on the input 4. The information signal is scrambled by combining this information signal with the processed noise signal on the output 8 in a scrambler 9. The scrambler 9 may include a simple adding or subtracting operation.

The scrambler 9 provides a scrambled information signal on an output 10 to a compressor 11. The compressor 11 may operate according to any suitable compression algorithm and provides a compressed scrambled information signal on an output 12. The scrambled compressed information signal can be transferred to the descrambling system 2 in any known manner, for example over the Internet, by broadcasting or stored on a suitable medium, such as a tape or CD.

The scrambling system 1 described shows the advantage that the scrambled output signal of the scrambler 9 has an entropy distribution corresponding with the entropy distribution of the information signal received on the input 4. In this manner the entropy distribution of the information signal is not changed by the scrambling operation so that any compression algorithm which is able to compress the clear information signal will be able to compress the scrambled information signal with substantially the same effectiveness.

The control unit 6 provides a key and entitlement file on an output 13, which file can be scrambled using a suitable scrambling algorithm, known per se. For scrambling the key and entitlement file, a private key of the descrambling system 2 is preferably used. The key and entitlement file can be transferred to the descrambling system 2 in any suitable manner.

The descrambling system 2 comprises a decompressor 14 receiving the compressed scrambled information signal from an input 15 of the descrambling system 2. The decompressor 14 may operate according to any suitable decompression algorithm. Within one system the same compression/decompression algorithm will be used. The decompressed output from the decompressor 14 is provided to a descrambler 16 which provides the clear information signal on an output 17 of the descrambling system 2. The descrambler 16 receives a descrambling signal on an input 18 and for providing this descrambling signal, the descrambling system 2 is provided with the following devices.

As shown in FIG. 1B, a control unit 19 is provided receiving the key and entitlement file and scrambling control information from the scrambling system 1. The key and entitlement file are forwarded to a secure device 20 which is tamper proof and can be a smart card for example. The secure device 20 comprises a noise generator 21 generating white noise. The noise generator 21 is made as a pseudo random noise generator corresponding to the pseudo random signal generator 5. The key received from the scrambling system 1 is used as a seed for this noise generator 21. In this manner the output noise signal of the generator 21 corresponds with the output noise signal of the generator 5. The output noise signal of the generator 21 is provided to a processor 22 which is controlled by the scrambling control information received from the scrambling system 1 to process the noise output signal to provide a processed noise signal on an output 23 corresponding to the processed noise output signal of the processor 7 and therefore having an entropy distribution corresponding with the entropy distribution of the clear information signal.

In the preferred embodiment shown in FIG. 1B, the processed noise signal on the output 23 is further processed in an equaliser 24 to compensate for any alterations in the scrambled information caused by the compression and decompression operations. Any alterations by the compression and decompression operations will also affect the scrambling signal included in the scrambled information signal, so that the processed noise signal provided by the processor 22 should be compensated for these alterations. In this manner the descrambling operation will be improved. The thus obtained descrambling signal is combined with the decompressed output from the decompressor 14 in the descrambler 16 which provides the clear information signal.

Although in the embodiments described above and hereinafter, respectively, a compressor 11 and decompressor 14 are included in the scrambling and descrambling system, respectively, it is noted that compressing and decompressing can be carried out in separate devices or steps.

The descrambling system 2 described will generally be part of a consumer electronic device or a PC. The descrambling system 2 shows the advantage that only a decompressed clear signal is available in the consumer device or PC. Unauthorised distribution of compressed files would require recompression before such files can be stored or redistributed across a network, for example. A major advantage is further that the noise generator 21 is included in the secure device 20 and that a high bandwidth noise signal is provided as an output signal. This makes redistribution of this noise signal extremely difficult in comparison to redistribution of the key used as a seed for the noise generator 21.

According to a preferred embodiment, protection against unauthorised copying of the information signal can be further increased by providing the secure device 20 with a processor 25 adapted to add a watermark signal to the output of the noise generator 21. The watermark signal may be obtained by combining a pseudo random sequence with a identification sequence. Any parts necessary to generate those sequences are deemed to be comprised in the processor 25. The watermark signal will be part of the descrambling signal provided to the descrambler 16 so that this watermark signal will be part of the clear information signal on the output 17. If the output signal would be recompressed, and this recompressed signal would be used for unauthorised copying or redistribution, the secure device 20 used for this purpose can be traced by means of the watermark signal. Regarding the manner in which a watermark signal can be added, reference is made to a co-pending application of the same applicant which is incorporated herein by reference.

A further protection against copying can be obtained by using the processor 25 of the secure device 20 to add a compression hindering signal to the noise output of the noise generator 21. This compression hindering signal will then be part of the descrambling signal used by the descrambler 16 and will be inserted in this manner into the information signal on the output 17. The compression hindering signal for example inserts noise into the information signal which will not affect the quality of the information signal. It will however significantly affect the compression algorithms to effectively compress the information signal.

In case of digital information signals a further protection against unauthorized copying could be added as follows. The descrambling system 2 can be provided with means for converting the decompressed but still scrambled signal from digital into analogue. Further, means for converting the descrambling signal from digital into analogue are provided. The thus obtained analogue scrambled signal and descrambling siganl are combined in the descrambler 16 to obtain a clear analogue information signal.

Figure 2A:
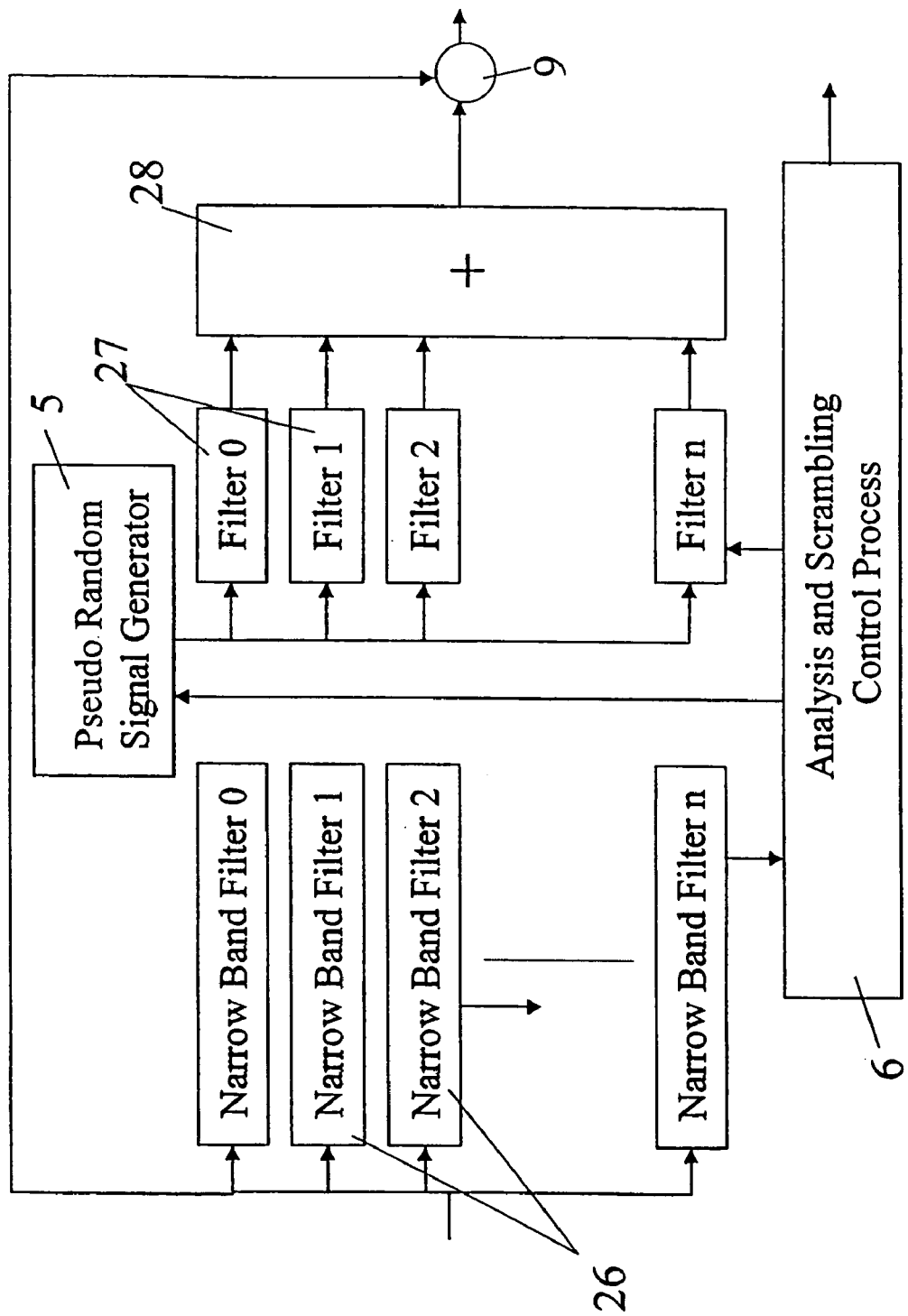
FIGS. 2A and 2B show a block diagram of an embodiment of the invention used for scrambling and descrambling an audio signal.
Figure 2:
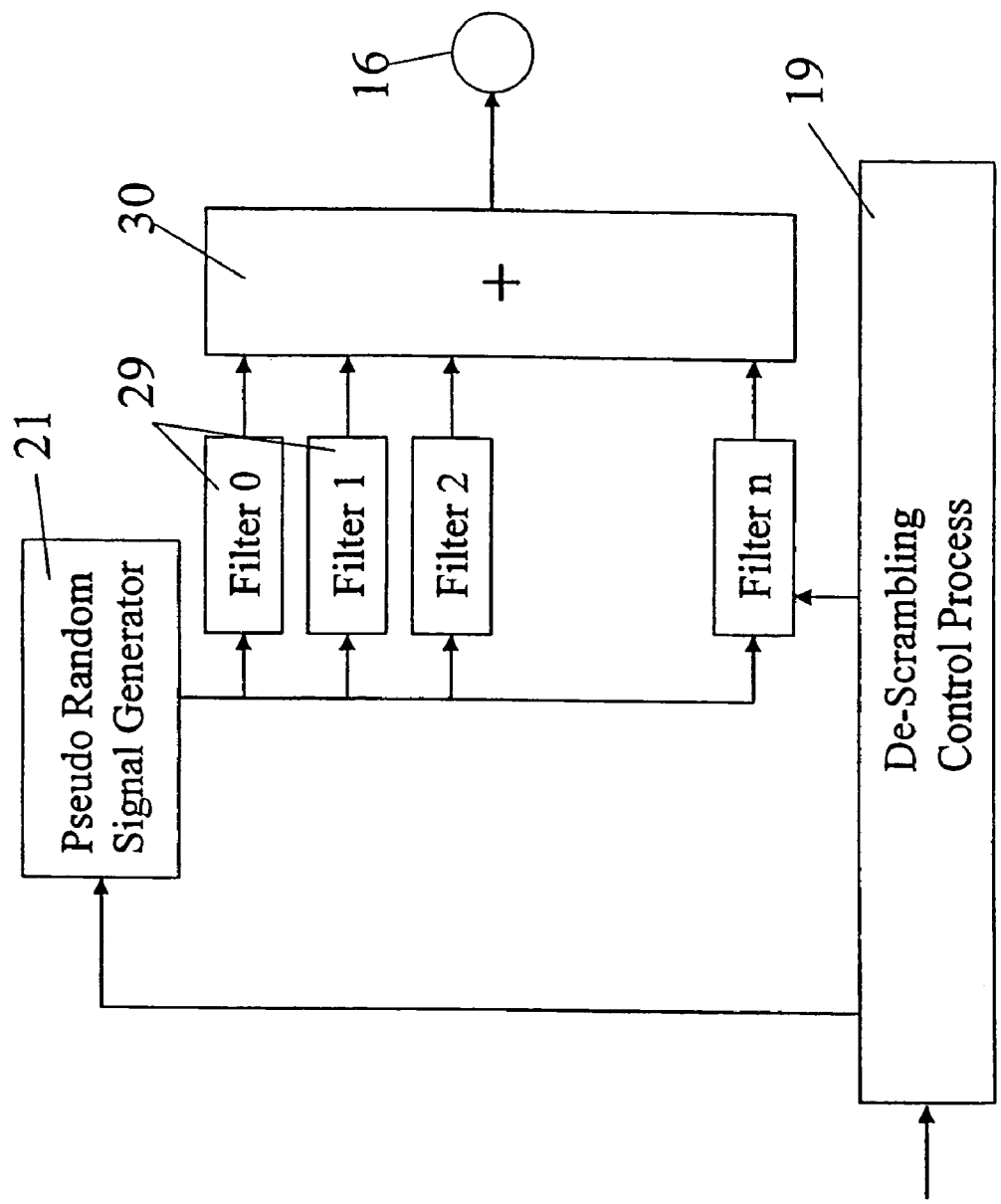

FIGS. 2A and 2B show an application of the system of the invention as generally described above for scrambling and descrambling audio signals. FIG. 2A shows the scrambling system which in the embodiment shown is adapted to operate on digital audio signals. However, the system can be implemented in the same manner for analogue audio signals. The scrambling system 1 comprises a plurality n of narrow band filters 26 corresponding to the analyser 3 of the system shown in FIG. 1. The narrow band filters 26 each provide information on the signal strength in the respective bands to the control unit 6. The noise generator 5 provides an output signal to a further plurality n of narrow band filters 27, wherein the control unit 6 enables only those filters corresponding to the narrow band filters 26, the outputs of which indicated a signal strength in the audio signal. The gain of each of the band filters 27 is adjusted by the control unit such that the noise output signal strength corresponds with the signal strength in the corresponding band of the audio signal. The outputs of the band filters 27 are summed to provide the scrambling signal as shown by block 28. The scrambling signal is combined with the audio signal in scrambler 9 and the output of scrambler 9 is compressed by compressor 11.

The descrambling system 2 is only partially shown in FIG. 2B and comprises a plurality of narrow band filters 29 corresponding to the narrow band filters 27. The noise generator 21 corresponds with the noise generator 5 of the scrambling system and is seeded by the key received from the scrambling system 1. The control unit 19 receives the scrambling control information from the control unit 6 and enables the same filters 29 in the descrambling system 2 as the filters 27 enabled by the control unit 6. The gain of the enabled filters 29 is adjusted accordingly. In this manner the descrambling signal is made by combining the outputs of the filters 29 as indicated by the block 30. The descrambling system 2 for audio signals further fully corresponds with the system shown in FIG. 1.

The system shown in FIG. 1 can also be used in case of still images or video signals. In case of still images, the JPEG compression algorithm can be used for example. According to this algorithm an image is divided into blocks of 8×8 pixels. A discrete cosine transform (DCT) is performed on each block. The DCT results in a set of coefficients that are completely orthogonal to each other. The analyser 3 can be adapted to analyse the entropy distribution of DCT sets of coefficients. Further the generator 5 is adapted such that noise is generated in a two-dimensional space and the information provided by the analyser 3 is used to adjust a set of filters to obtain noise having a signal strength corresponding to the significant coefficients in the DCT sets of coefficients. Thereafter the thus obtained scrambling signal is combined with the DCT sets of coefficients, where after the JPEG algorithm can still be used to compress the scrambled signal. The descrambling system operates in a corresponding manner to descramble and decompress the compressed scrambled signal.

In typical implementations of video encoding a still image is utilised as a base. A reference frame is coded using a still image compression scheme, for example the I-frame in the well-known MPEG2 compression algorithm. Scrambling and descrambling of this reference frame occurs in the same manner as described above for a still image. Successive frames are compressed using the previous frame as a reference frame. In the MPEG2 compression algorithm, blocks of the next frame are compared with the reference frame and any part of the reference frame that provides the best match is then used as the reference block. The difference is then coded. A vector is also defined which indicates the position of the reference block with respect to the block being coded. The differences between the two frames are computed and a DCT is performed on the differences and the DCT coefficients are compressed.

According to the invention noise can be added to all or a plurality of blocks in a first or reference frame and this noise needs to be propagated into future frames such that the difference coding remains intact. This means that at the descrambling system side noise used as descrambling signal needs to be reused as descrambling signal for future blocks. Further scrambling and descrambling can be performed on the next blocks by adding noise to the difference DCT information, wherein as in the described examples the noise added must have the same entropy ditribution as the difference DCT information.

It will be understood that the JPEG and MPEG algorithms and DCT are mentioned as examples only, and should not be explained as limitinhg the invention to such examples.

It is noted that the scrambling control information provided by the control unit 6 can be transfered as a separate file to the descrambling system 2. As a preferred alternative the scrambling control information can be included into the information signal as a type of header or the like, wherein the scrambling control information is modulated to bring this signal in the same frequency band as the information signal.

In the above described embodiments an equaliser 24 is used to compensate for the effects of the compression and decompression. This means that this equaliser actually replicates the transfer function for the process that the information signal undergoes. Depending on the circumstances it can be complicated to determine the transfer function by measuring the impulse response of this process. In the described system of the invention this problem is solved by including an impulse in the beginning of the information signal. The impulse is not scrambled and undergoes the same compression and decompression steps as the information signal. The control unit 19 uses the thus obtained impulse response for the compression and decompression to model the transfer function provided by the equaliser 24. As an alternative a sequence of sine waves covering the frequency bands of interest can be included in the information signal. Again the control unit 19 can measure the attenuation and phase shift of the sine waves received to determine the impulse response of the system.

These examples show that by adding a known signal to the information signal the control unit 19 can measure the impulse response and can adjust the equaliser 24 such that the equaliser replicates the transfer function so that the regenerated scrambling signal in the descrambling system will correspond with the scrambling signal in the scrambling system.

The same technique can be used in case of a system for still images or video signals. In case of still images a black band is added to one side of the image. In one block of the black band an impulse is inserted into the middle of the block. The impulse response can be determined by the control unit by checking the pixels around the pixel corresponding to the impulse inserted. In case of video the same technique as for still images can be used. As an alternative a black frame could be inserted in the sequence of frames. In the middle of this black frame an impulse can be included. The control unit can check the pixels of the black frame around the impulse pixel to determine the impulse response.

Figure 3:
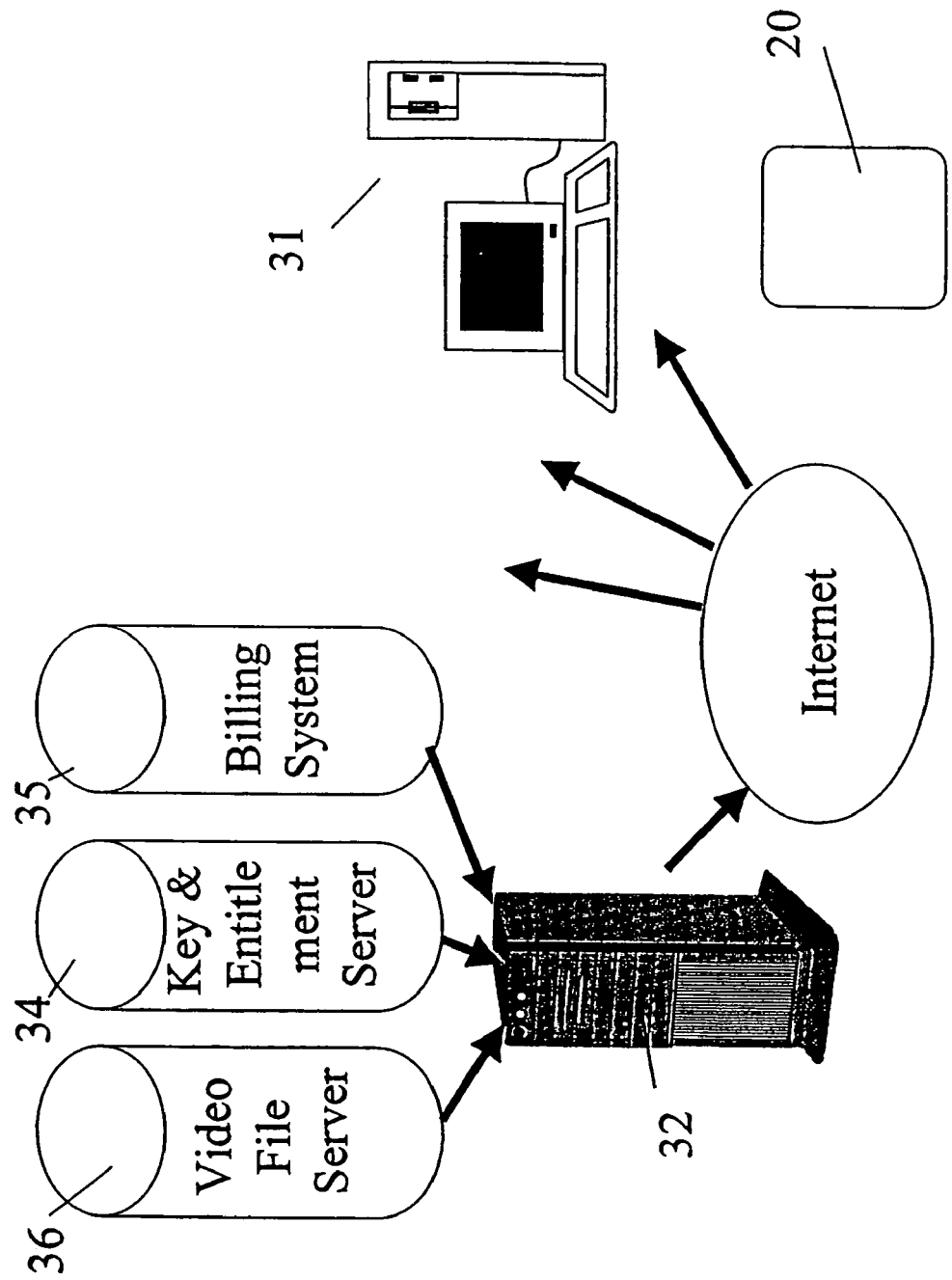
FIG. 3 shows an application of the system of the invention for audio distribution over the Internet.
Figure 4:
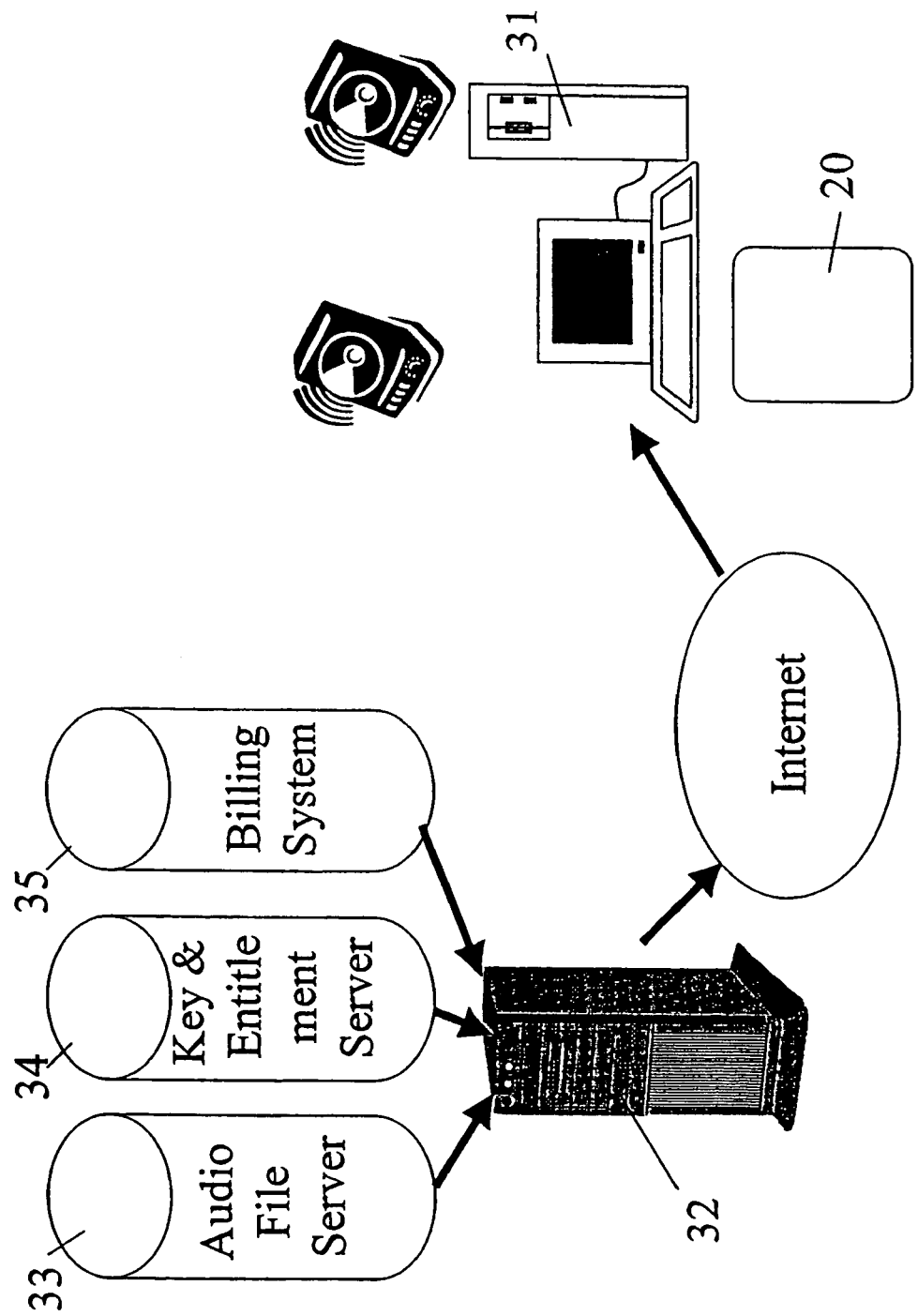
FIG. 4 shows an application of the system of the invention for information broadcast over the Internet.

By way of example some applications of the system of the invention described are shown in FIGS. 3,4 and 5.

FIG. 3 shows an application for distribution of audio signals over the Internet. Although at this moment it is already possible to download MP3 audio files from the Internet, the software industry is very reluctant to make available MP3 compressed audio files as in compressed form audio piracy will be trivial and wide spread using the Internet as distribution means. For example someone could legitimately buy an MP3 audio track and distribute the same using E-mail. Even if the compressed audio file is encrypted, pirate software programs to decrypt the content could become available, where after it will be possible to store the clear compressed file for later distribution. These disadvantages of the use MP3 or otherwise compressed audio files can be overcome by using the system of the invention in an application as shown in FIG. 3.

It will be understood that although only one consumer PC 31 is shown in FIG. 3, any number of PC's can be part of the system, wherein each PC corresponds with one descrambling system 2 of FIG. 1. It is assumed that the required decompressing and descrambling software is installed on the PC 31. This software can for example downloaded from the Internet. The consumer using the PC 31 can visit a web site for buying one or more specific audio files. The web site is running on a web server 32 and an audio file server 33, a key and entitlement server 34 and billing system 35 are connected to the web server 32. The web server 32, audio file server 33 and key and entitlement server 34 together provide the scrambling system 1. Although in the embodiment shown in FIG. 3, a billing system is used, this is not necessary and the system can also be used in an embodiment without billing system, wherein the consumer is charged in another manner or not charged at all for the downloaded audio files.

When the consumer has made a selection and confirmed the purchase made in any suitable manner, the compressed scrambled audio file and the key and entitlement file are transferred to the PC 31 of the consumer. The audio file is stored on hard disc or any other storage media connected to the PC 31. The entitlement and key file is loaded into the secure device 20 connected to the PC 31. The key and entitlement file is for example encrypted using a key unique to the secure device 20 of the corresponding consumer. The consumer can now replay the audio file as long as the secure device is connected to the PC.

If this consumer would try to distribute the compressed audio file and the key and entitlement file, the audio file will still be scrambled and the key and entitlement file which is specific to the secure device 20 of this specific consumer, will be rejected by any other secure device.

The entitlement provided to the consumer can contain different entitlements, such as for example play once only, play for a limited period of time or a free sample play. Further, a possibility in the entitlement file could be "anonymous ownership" allowing entitlements and keys to be exchanged between secure devices using secure protocols. The entitlement can be such that only one secure device at a time is allowed to have the entitlement and key. Further it is possible to have an entitlement for group ownership. In this case a consumer could be allowed to play the audio file on a number of audio players owned by this consumer.

If the user of the PC 31 would send a copy of the decompressed audio file to someone else, it will be necessary to recompress the audio file. This will significantly increase the time and effort to make a copy and by using the above-described embodiment of the secure device 20, wherein a watermark signal is added to the descrambling signal, the copy can be traced to the secure device 20 used for descrambling the audio file. Further in case also the compression hindering signal is added to the descrambling signal, the quality of the new copy will be significantly decreased preventing unauthorised distribution.

FIG. 4 shows another application of the system of FIG. 1 for broadcast on the Internet. It is noted that the same principle can be used in other types of broadcast networks.

If in the system shown in FIG. 4 the PC 31 has tuned on a specific broadcast signal, key and entitlement files are broadcast from the key and entitlement server 34 to the PC 31 and the key and entitlement files are loaded into the secure device 20. The secure device 20 generates the descrambling signal in synchronisation with the compressed and scrambled video files received from the video file server 36, which files can either be provided in real time or be stored on a suitable storage medium.

It is essential that the key which is used to generate the descrambling signal, never appears in the clear. The noise signal provided by the secure device 20 has a large bandwidth, similar to that of the decompressed data, as explained above. Any rebroadcast of the descrambling signal by a pirate can be traced to the corresponding secure device 20 due to the watermark signal added to the descrambling signal. In this manner the pirate can be quickly traced and the secure device 20 can be disabled. Rebroadcasting of the video content is neither possible as it is not provided in a clear compressed form. Rebroadcasting would require recompressing the content which will be hindered by adding the compression hindering signal and the rebroadcasted signal can be traced by the watermark signal.

FIG. 5 shows an application of the system of FIG. 1 to prevent unauthorised copying of video discs or DVD'S. The same principle can be used to prevent unauthorised copying of audio CD's.

In particular with respect to DVD's, software industry is concerned about the protection of the video content. The current mechanisms for copy protection are extremely weak, in particular when a DVD player is coupled with a PC. Basically, all conventional mechanisms rely on the player being tamper resistant to be effective. In practice a DVD player is not tamper resistant. The disadvantage of the current copy protection mechanisms can be overcome by applying the system of the invention, for example in an application as shown in FIG. 5.

A DVD player 36 is made such that the player 36 can be coupled with a secure device 20. The DVD player 36 and secure device 20 together provide a descrambling system 2. When a consumer purchases a new DVD, the consumer provides the secure device serial number to the point of sale 37. The point of sale 37 contacts an authorisation centre 38 and this centre 38 generates a key and entitlement file which is transferred to the DVD player and stored in secure device 20. The DVD contains the video information in compressed scrambled form. Once the key and entitlement file is downloaded into the secure device 20, replay of the content is possible as described above. According to the example of FIG. 5, the key and entitlement file is downloaded over the Internet. It is of course possible to transfer the key and entitlement file in any suitable manner to the player 36, for example via a modem connection or a floppy disc or the like. The DVD's and key and entitlement files are provided by using a scrambling system 1 as described above.

It will be clear that the invention provides an improved copy protection which can be used in various applications. Although in the embodiments described and in the drawings separate parts of the systems are mentioned and shown, it will be clear that the systems described can be implemented by means of PC's or other microprocessor based systems in combination with suitable application programs.

The invention is not restricted to the above described embodiments which can be varied in a number of ways within the scope of the following claims.

The invention claimed is:

1. System for processing an information signal, comprising a system for scrambling the information signal and at least one system for descrambling the scrambled information signal, said scrambling system comprising means for analysing the entropy distribution of the information signal, means for scrambling the information signal in dependence on information on the entropy distribution of the information, which scrambling means receive information on the entropy distribution from the analysing means as input and receive the information signal as input, wherein the scrambling means are arranged to perform a scrambling operation on the information signal controlled by the information on the entropy distribution so as to provide a scrambled information signal having an entropy distribution corresponding with the entropy distribution of the information signal and means for compressing the scrambled information signal, said descrambling system comprising means for decompressing the compressed scrambled information signal, and means for descrambling the scrambled information signal to provide the information signal.

2. System according to claim 1, wherein said scrambling means comprises means for generating a scrambling signal having an entropy distribution corresponding with the entropy distribution of the information signal, based on the information on the entropy distribution received from the analysing means, and means for combining the scrambling and information signals to obtain the scrambled information signal, wherein said descrambling means comprises means for regenerating the scrambling signal as a descrambling signal and means for combining the descrambling and scrambled information signals to obtain the information signal.

3. System according to claim 2, wherein said analysing means provides scrambling control information and wherein said generating means generates a noise signal and comprises means for processing said noise signal as controlled by the scrambling control information to obtain the scrambling signal, wherein said scrambling control information is transferred to the descrambling system, wherein said regenerating means generates a noise signal and comprises means for processing said noise signal as controlled by the scrambling control information to obtain the descrambling signal.

4. System according to claim 3, wherein the scrambling control information is transferred to the descrambling system as part of the information signal.

5. System according to claim 3, wherein said generating and regenerating means comprises a white noise generator and filtering means controlled by said scrambling control information to filter the white noise to obtain noise having an entropy distribution corresponding with the entropy distribution of the information signal.

6. System according to claim 3, wherein said generating and regenerating means comprises a narrow band noise signal generator and modulating means for modulating the narrow band noise signal controlled by said scrambling control information to obtain noise having an entropy distribution corresponding with the entropy distribution of the information signal.

7. System according to claim 5, wherein the noise generator of the generating means is a pseudo random noise generator seeded by a key, wherein said regenerating means comprises a corresponding pseudo random noise generator which is seeded by the same key, wherein means are provided to transfer the key from the scrambling system to the descrambling system in a secure manner.

8. System according to claim 7, wherein the scrambling system comprises means for periodically generating a new key.

9. System according to claim 7, wherein said scrambling system comprises means for generating entitlement files, wherein said transfer means transfers an entitlement file together with a key to the descrambling system.

10. System according to claim 7, wherein the transfer means insert the key or entitlement file into the information signal to transfer this file as part of the information signal, preferably together with the scrambling control information.

11. System according to claim 3, wherein said scrambling system is adapted to insert an impulse response measuring signal into the information signal, wherein the descrambling system is adapted to determine the impulse response of the system by comparing the received impulse response measuring signal with the original impulse response measuring signal, the descrambling system comprising an adjustable equaliser to process the regenerated noise signal, wherein the equaliser is adjusted to model the transfer function of the system.

12. System according to claim 1, wherein the scrambling means include means for generating a scrambling signal, seeded by a key and under control of the information on the entropy distribution, and means for combining the scrambling and information signals to obtain the scrambled information signal.

13. System according to claim 1, wherein the scrambling means include an output arranged to provide the scrambled information signal having an entropy distribution corresponding with the entropy distribution of the information signal to the compression means.

14. System for scrambling an information signal, comprising means for analysing the entropy distribution of the information signal, means for scrambling the information signal in dependence on the entropy distribution of the information signal, means for receiving information on the entropy distribution of the information signal and providing, in dependence on the information on the entropy distribution, information controlling the scrambling of the information signal, such that the means for scrambling provide a scrambled information signal having an entropy distribution corresponding with the entropy distribution of the information signal.

15. System according to claim 14, wherein said analysing means provides scrambling control information and wherein said scrambling means comprises generating means generating a noise signal and means for processing said noise signal as controlled by the scrambling control information to obtain the scrambling signal, wherein means are provided to transfer the scrambling control information to a descrambling system.

16. System according to claim 14 for scrambling audio signals, comprising a first plurality of first narrow band filters, each filter having an input receiving the audio signal and an output signalling the audio signal strength in the corresponding bandwidth, a processor receiving the output signals of the narrow band filters to analyse the entropy distribution of the audio signal, said processor providing the scrambling control information, a pseudo random signal generator having an output, a second plurality of second narrow band filters corresponding to the first plurality of first narrow band filters, each second filter having an input connected to the output of the random signal generator and an enable and gain control input, said processor being connected to the enable and gain control inputs of the second filters, wherein the output signals of the second filters are combined to obtain a noise signal having an entropy distribution corresponding with the entropy distribution of the audio signal, and wherein the noise signal is combined with the audio signal to obtain a scrambled audio signal.

17. System for descrambling a scrambled audio signal provided by the scrambling system of claim 16, wherein said processing means comprises a third plurality of narrow band filters, each filter having an input receiving the noise signal, an input receiving enable and gain control signals provided by the controlling means in accordance with the scrambling control information, and an output, wherein the outputs of the filters are combined to provide the descrambling signal.

18. System according to claim 14 for scrambling still images, wherein the image information is divided in blocks and each block is transformed to obtain a set of coefficient, wherein the analysing means analyses the entropy distribution of the transformed image information and provides the scrambling control information, wherein the generating means generates noise in a two dimensional space and wherein the processing means provides a filtered noise signal as scrambling signal.

19. System according to claim 18 for scrambling video, wherein a reference frame is processed as a still image, wherein next frames are compressed by determining differences with a reference frame and transforming the differences, wherein the scrambling signal used in the reference frame is reused in the next frames and wherein preferably the transformed difference signals are scrambled with a suitably processed scrambling signal.

20. System according to claim 19, comprising means for descrambling the scrambled information signal to provide the information signal, wherein said descrambling means comprises means for regenerating the scrambling signal as a descrambling signal under the control of information representative of the entropy distribution of the information signal, means for combining the descrambling and scrambled information signals to obtain the information signal, and controlling means, wherein said controlling means controls the means for regenerating the scrambling signal to reuse the regenerated scrambling signal for descrambling video frames which have been compressed by compressing differences with a reference frame.

21. System for distribution of information, comprising a system according to claim 14, a central server including means for providing a key and entitlement file, means for providing scrambled compressed information, and means to transfer scrambled compressed information and a corresponding key and entitlement file to one or more receiving systems adapted to request such a transfer, each of said receiving systems having a secure device receiving the key and entitlement file and providing an output used in descrambling the received scrambled compressed information.

22. System according to claim 21, adapted for distribution of information comprising at least one audio signal.

23. System according to claim 21, adapted for distribution of information comprising at least one video signal.

24. System according to claim 14, wherein the scrambling means include means for generating a scrambling signal, seeded by a key and under control of the information on the entropy distribution, and means for combining the scrambling and information signals to obtain the scrambled information signal.

25. System for descrambling a scrambled information signal obtainable by combining a scrambling signal with the information signal, comprising means for descrambling the scrambled information signal to provide the information signal, wherein said descrambling means comprises means for regenerating the scrambling signal as a descrambling signal under the control of information representative of the entropy distribution of the information signal, and means for combining the descrambling and scrambled information signals to obtain the information signal, wherein said means for regenerating the scrambling signal generates a noise signal and comprises means for processing said noise signal to obtain the descrambling signal, wherein said means for regenerating the scrambling signal comprises a white noise generator and filtering means to obtain noise having an entropy distribution corresponding with the entropy distribution of the information signal, wherein the noise generator is a pseudo random noise generator seeded by a key received from the scrambling system.

26. System according to claim 25, wherein said regenerating means comprises a narrow band noise signal generator and modulating means for modulating the narrow band noise signal to obtain noise having an entropy distribution corresponding with the entropy distribution of the information signal.

27. System according to claim 25, comprising means for controlling said means for processing said noise signal, wherein said controlling means receives the scrambling control information and said processing means is controlled in accordance with said scrambling control information to provide the descrambling signal.

28. System according to claim 25, wherein the scrambled information signal is compressed and decompressed, wherein the regenerating means comprises means for equalising the descrambling signal to compensate for compressing and decompressing of the original scrambling signal contained in the scrambled information signal.

29. System according to claim 28, wherein the equalising means is adjustable by said controlling means, said controlling means being adapted to measure the impulse response of the compressing and decompressing operations and to adjust the equalising means to provide a corresponding impulse response.

30. System according to claim 25, wherein at least a part of the regenerating means, in particular the noise signal generator, is accommodated in a secure device, for example a smart card.

31. System according to claim 30, wherein the secure device is adapted to add a watermark signal to the descrambling signal.

32. System according to claim 30, wherein the secure device is adapted to add a compression hindering signal to the descrambling signal.

33. System according to claim 25, wherein the scrambled information signal and the descrambling signal are digital signals, wherein means are provided for converting the scrambled signal and the descrambling signal into analogue signals, wherein the combining means combine the analogue signals to obtain a clear analogue information signal.

34. System for descrambling a scrambled information signal obtainable by combining a scrambling signal with the information signal, comprising means for descrambling the scrambled information signal to provide the information signal, wherein said descrambling means comprises means for regenerating the scrambling signal as a descrambling signal under the control of information representative of the entropy distribution of the information signal, and means for combining the descrambling and scrambled information signals to obtain the information signal, wherein the scrambled information signal is compressed and decompressed, wherein the regenerating means comprises means for equalising the descrambling signal to compensate for compressing and decompressing of the original scrambling signal contained in the scrambled information signal, wherein the equalising means is adjustable by said controlling means, said controlling means being adapted to measure the impulse response of the compressing and decompressing operations and to adjust the equalising means to provide a corresponding impulse response.

35. System according to claim 34, wherein at least a part of the regenerating means, in particular the noise signal generator, is accommodated in a secure device, for example a smart card.

36. System according to claim 35, wherein the secure device is adapted to add a watermark signal to the descrambling signal.

37. System according to claim 35, wherein the secure device is adapted to add a compression hindering signal to the descrambling signal.

38. System according to claim 34, wherein the scrambled information signal and the descrambling signal are digital signals, wherein means are provided for converting the scrambled signal and the descrambling signal into analogue signals, wherein the combining means combine the analogue signals to obtain a clear analogue information signal.

39. System according to claim 34, wherein said means for regenerating the scrambling signal generates a noise signal and comprises means for processing said noise signal to obtain the descrambling signal.

40. System according to claim 39, wherein said means for regenerating the scrambling signal comprises a white noise generator and filtering means to obtain noise having an entropy distribution corresponding with the entropy distribution of the information signal.

41. System according to claim 39, wherein said regenerating means comprises a narrow band noise signal generator and modulating means for modulating the narrow band noise signal to obtain noise having an entropy distribution corresponding with the entropy distribution of the information signal.

42. System according to claim 39, comprising means for controlling said means for processing said noise signal, wherein said controlling means receives the scrambling control information and said processing means is controlled in accordance with said scrambling control information to provide the descrambling signal.

* * * * *

UNITED STATES PATENT AND TRADEMARK OFFICE
CERTIFICATE OF CORRECTION

| | |
|---|---|
| PATENT NO. | : 7,050,588 B1 |
| APPLICATION NO. | : 09/601233 |
| DATED | : May 23, 2006 |
| INVENTOR(S) | : Wajs et al. |

It is certified that error appears in the above-identified patent and that said Letters Patent is hereby corrected as shown below:

on title page, in (item (75),) in "Inventors", in column 1, line 3, delete "Leiderdorp (NL)" and insert - - Nieuw-Vennep (NL) - - , therefor.

on title page, in (item (73),) in "Assignee", in column 1, line 1, after "Hoofddorp" insert - - 2132 HD - -.

on title page, in(item (56),) under "U.S. Patent Documents", in column 2, line 2, after "6,618,484" delete "B1 *" and insert - - B2 * - -, therefor.

On title page, in (item (56),) under "Other Publications", in column 2, line 3, delete "1996." and insert - - 1996, - -, therefor.

On title page, in (item (56),) under "Other Publications", in column 2, line 5, after "University" insert - - , - -.

column 4, line 24, delete "siganl" and insert - - signal - -, therefor.

column 5, line 39, delete "ditribution" and insert - - distribution - -, therefor.

column 5, line 43, delete "limitinhg" and insert - - limiting - -, therefor.

column 5, line 45, delete "transferred" and insert - - transferred - -, therefor.

column 7, line 57, delete "DVD'S." and insert - - DVD's. - -, therefor.

UNITED STATES PATENT AND TRADEMARK OFFICE
CERTIFICATE OF CORRECTION

PATENT NO. : 7,050,588 B1
APPLICATION NO. : 09/601233
DATED : May 23, 2006
INVENTOR(S) : Wajs et al.

It is certified that error appears in the above-identified patent and that said Letters Patent is hereby corrected as shown below:

column 8, lines 38-39, in Claim 1, delete "information," and insert - - information signal, - -, therefor.

Signed and Sealed this

Fifth Day of September, 2006

JON W. DUDAS
*Director of the United States Patent and Trademark Office*